United States Patent
Higby

(10) Patent No.: US 6,398,968 B1
(45) Date of Patent: Jun. 4, 2002

(54) METHODS FOR PRESSURE STABILIZED REMOVAL OF CONTAMINANTS FROM SOLUTION

(75) Inventor: Loren P. Higby, Sandy, UT (US)

(73) Assignee: Watermark Technologies, LLC, Salt Lake City, UT (US)

( * ) Notice: Subject to any disclaimer, the term of this patent is extended or adjusted under 35 U.S.C. 154(b) by 0 days.

(21) Appl. No.: 09/570,805

(22) Filed: May 15, 2000

Related U.S. Application Data
(60) Provisional application No. 60/184,983, filed on Feb. 25, 2000.

(51) Int. Cl.⁷ ................................................ C02F 1/58
(52) U.S. Cl. .................. 210/721; 210/724; 210/726; 210/738; 210/906; 210/911; 210/912; 210/913; 210/914; 423/87
(58) Field of Search ......................... 210/721, 722, 210/724, 726, 738, 753, 756, 758, 759, 760, 906, 911, 912, 913, 914; 423/87

(56) References Cited

U.S. PATENT DOCUMENTS

| | | | |
|---|---|---|---|
| 4,241,039 A | * 12/1980 | Koh et al. | 423/531 |
| 4,430,228 A | * 2/1984 | Paterson | 210/665 |
| 4,566,975 A | * 1/1986 | Allgulin | 210/711 |
| 4,844,873 A | * 7/1989 | Lebon et al. | 423/12 |
| 5,308,501 A | * 5/1994 | Eckert | 210/718 |
| 5,324,439 A | * 6/1994 | Chen et al. | 210/761 |
| 5,348,662 A | * 9/1994 | Yen et al. | 210/717 |
| 5,358,643 A | * 10/1994 | McClintock | 210/709 |

* cited by examiner

*Primary Examiner*—Peter A. Hruskoci
(74) *Attorney, Agent, or Firm*—Kirton & McConkie; Michael F. Krieger

(57) ABSTRACT

Embodiments of the present invention relate to methods and systems for removal of contaminants from aqueous solutions. The methods and systems of these embodiments are particularly suited to removal of arsenic species as well as transition-metals, post-transition-metals, phosphates and other contaminants in aqueous solutions. The methods and systems of embodiments of the present invention provide for the addition of a reagent to a contaminated solution in combination with a pressurization process and a depressurization process. Contaminant particulates and solids produced in these processes may be removed by conventional separation techniques.

21 Claims, 9 Drawing Sheets

Combination
Air Injection/Chemical
Oxidant
Method

Batch Process

Aeration Method

Air Injection Method

Chemical Oxidant Method

Combination Aeration/Air Injection Method

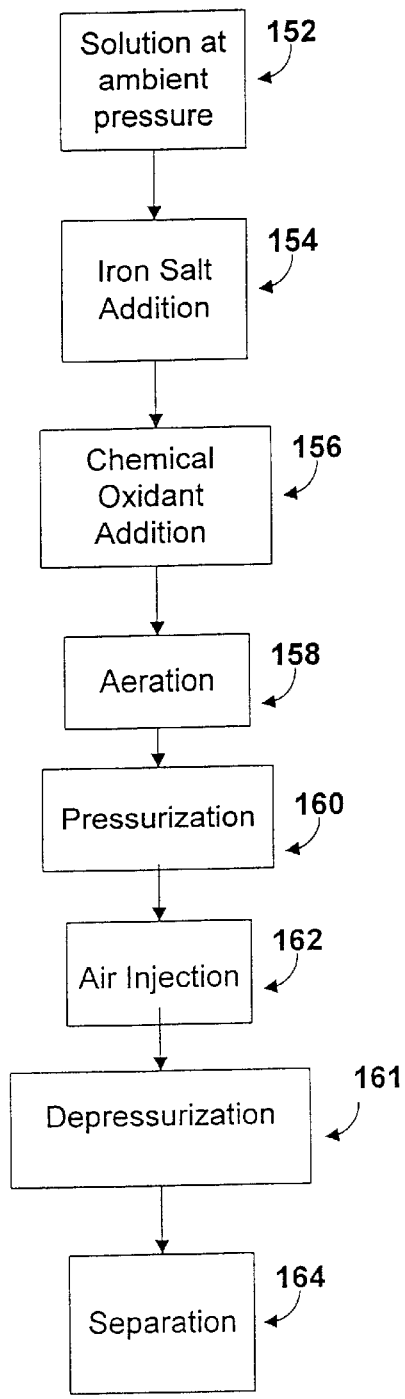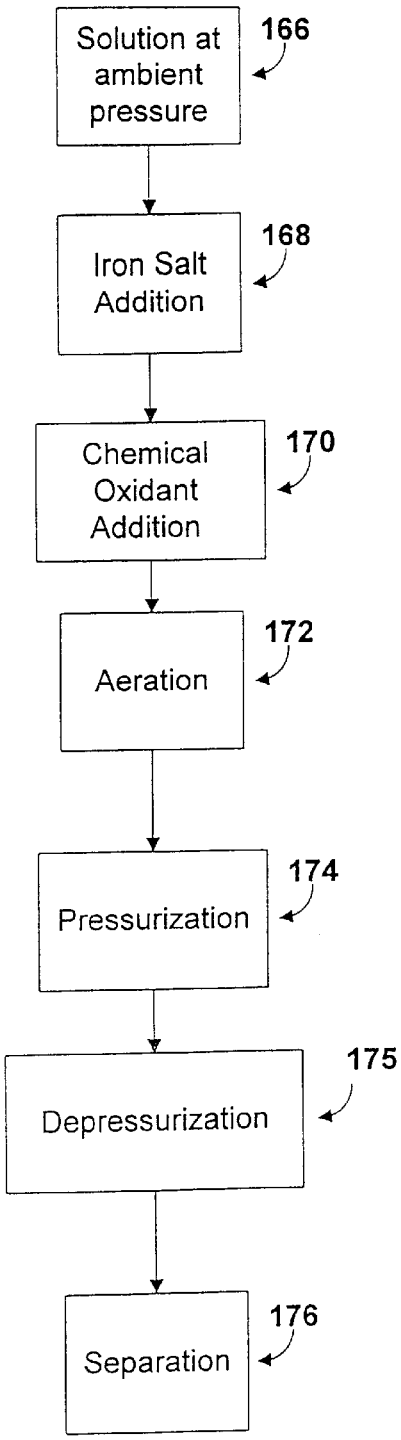
Figure 11
Combination
Aeration/Air Injection/
Chemical Oxidant
Method
Figure 12
Combination
Aeration/Chemical
Oxidant Method Combination
Air Injection/Chemical
Oxidant
Method

METHODS FOR PRESSURE STABILIZED REMOVAL OF CONTAMINANTS FROM SOLUTION

This appln claims benefit of Prov. No. 60/184,983 filed Feb. 25, 2000.

THE FIELD OF THE INVENTION

Embodiments of the present invention relate to methods and apparatus for removing contaminants from water. More particularly, embodiments of the present invention create arsenic-adsorbing or other contaminant-adsorbing enhanced iron III hydroxides or iron hydroxycarbonates that remove arsenic and other contaminants from anoxic or oxic water using continuous in-stream and batch process methods which may combine both dissolved inorganic arsenic V and arsenic III species with minimal iron salts at elevated solution pressures, some times with forced air injection or aeration, followed by depressurization of the solution. Including pressurization and subsequent solution depressurization within the treatment sequence rapidly increases particulation reaction velocities involving dissolved inorganic arsenic V and arsenic III species, transition and post-transition-metal contaminants, other contaminants and the injected iron salts. Aeration at ambient conditions, air injection after pressurization and addition of chemical oxidants may also help increase reaction rates in certain solutions. Subsequent separation of the particulated species from the solution can render the water suitable for human consumption.

The present invention also reduces the amount of iron needed for the removal of contaminants when compared with processes carried out completely at ambient pressure.

BACKGROUND

Domestic water supplies often come from underground aquifers which contain anoxic water that has leached through and otherwise contacted minerals, sediments and rock layers for extended periods of time. These minerals, sediments and rocks often contain high concentrations of minerals, metals and other elements and compounds that are deleterious to human health. As a consequence of this contact, water in these aquifers becomes contaminated with some of the indigenous contaminants rendering the water unsafe for human consumption. Other water sources that may be used for domestic water supplies may also become contaminated with metallic ions and other contaminants through industrial pollution and other processes. These contaminated waters, prior to human consumption, will require remediation treatments.

Arsenic is one element that is often found in water sources and is pathological, in terms of human health of specific population segments, at all levels of concentration in drinking water concentrations. Several methods are known for removing arsenic species from water, however each has limitations and or disadvantages, which make embodiments of the present invention preferable in many applications.

Methods using electrolytic cells for electrochemical insolubilization of metallic ions using sacrificial anodes are known for arsenic removal, but require an energy source to power the electrolytic cell and do not address the issue of removing dissolved inorganic arsenic III species.

Other known methods require significant changes in pH levels to the bulk solution to effectuate precipitation of arsenic and other contaminant species from solution (i.e. lime addition). These processes additionally require a readjustment of the pH level after treatment to near-neutral conditions. These two requirements are chemically intensive and equipment intensive. Another method requires ultrafiltration and the addition of anti-scalants as pre-treatments for reverse osmosis treatment systems that remove arsenic species. This treatment method is ineffectual in terms of removing dissolved inorganic arsenic III species without chemical oxidation, which in turn is deleterious to the systems membranes. Other methods utilize adsorptive materials that are rapidly consumed and become solid waste along with the regenerative solutions required by the system (i.e. active alumina, ion exchange).

In some instances, a treatment method will efficiently remove dissolved arsenic and other species from a specific water source but be far less efficient when the same operational parameters are applied at a second autonomous water source. In particular, inconsistency of performance capabilities of the iron coagulation treatment system is problematic.

To achieve efficiency with nearly all anoxic ground water sources this method often requires large additions of either ferric chloride or ferric sulfate to the bulk solution. Some of these water sources require the addition of nearly 40-mg of ferric chloride per liter of treated water to achieve a residual arsenic level less than 5 to 10 parts per billion. This chemically-intensive practice of adding voluminous ferric chloride solutions results in a significant pH shift in the bulk solution towards the acid region. To counter the acid shift, the treatment facility is engineered to add base solutions to the bulk solution causing a return of the bulk solution pH to near-neutral conditions. After physical separation of the newly created particulate matter from the bulk solution the resulting accumulation of solid waste is massive, which is problematic in terms of disposal requirements.

Many known methods of arsenic removal also fail to reduce arsenic concentrations to acceptable levels. Some methods only reduce arsenic concentration to a level of approximately 20 to 50 parts per billion. This may meet some current standards, however standards are likely to become more stringent in the future rendering these methods obsolete and unusable. Furthermore, the increased protection provided by methods that significantly reduce contaminant levels in drinking waters is a benefit to consumers as well as water suppliers.

Most of these existing methods are overly complex, labor intensive, produce large waste streams, require large facilities and land, are expensive and require the addition of large quantities of various chemicals for precipitation and pH adjustment.

What is needed is a method and physical system that is conventional in physical design and construction that provides consistent and near-complete removal of all contaminating arsenic species, heavy-metal, transition-metal and post-transition-metal contaminants contained within all types of water sources and yields a small solid waste product.

SUMMARY AND OBJECTS OF THE INVENTION

The methods and apparatus of embodiments of the present invention provide for the removal or reduction of dissolved inorganic arsenic V and arsenic III species as well as other metallic and nonmetallic contaminants in anoxic or oxic aqueous solutions through continuous in-stream and batch method processes. Under preferred methods of the present invention, an anoxic or oxic aqueous solution may be treated by the addition of iron salts to the solution combined with pressurization and depressurization of the solution. The processes of embodiments of the present invention may occur at a substantially neutral pH.

Chemical oxidants, prior to pressurization, may also be added to speed-up or otherwise enhance the reaction. The iron-doped solution may also be aerated prior to pressurization. In the case of an arsenic contaminated solution, salt addition and optional oxidant addition and aeration are followed by pressurization of the solution to cause dissolved inorganic arsenic V species to precipitate and stabilize. Pressurization prepares dissolved inorganic arsenic III species to become particulate during the subsequent depressurization and ambient reaction. Additional aeration, air injection or other oxygenation methods may be performed prior to or during pressurization. The pressurization step of a preferred treatment method lasts for a short duration of time, typically 1 second to 60 seconds, followed by a depressurization step to near ambient pressures for typically 1 to 5 minutes. However, for some methods and solutions, pressurization step reaction times of 2 minutes or more may be used and a depressurization step of as little as 5 seconds to as much as 45 minutes may be used.

The depressurized aqueous solution may reside in an ambient pressure reaction vessel or conduit in a quiescent state (batch process) or free-flowing state (continuous in-stream) for a period of time prior to physical separation. Particulate and precipitated arsenic-containing or other contaminant-containing solids are stabilized and are then separated from the solution by pressure filtration, sedimentation or other solid-liquid separation methods.

Arsenic removal efficiencies, based upon efficient filtration capabilities for physically removing particulate matter at 5 micron in size and greater, are such that final effluent concentrations are typically less than 2 parts per billion (ppb) arsenic. During continuous in-flow processes, pressurization may be achieved by pumping the solution into a pressure tank or by utilizing the head pressure of pumps associated with ground water sources to pump directly into pressure tanks. An inverted siphon or discharge into a tank of sufficient depth to achieve the desired pressure are other methods of achieving pressurization during in-flow processes.

One of the advantages of selected methods of the present invention is their flexibility. These methods may be applied to large or small scale batch methods for arsenic and other contaminant removal. For batch processes, the solution may be pressurized by filling a tank with iron-doped or iron-oxidant-doped solution, which may also be aerated, followed by pressurization by electric pump or other means. After a short reaction time under pressure has elapsed, the solution is then depressurized to allow for the final particulation reactions to occur. Similar arsenic-removal benefits may be achieved by injection of a solution of iron salt at elevated pressure, followed by precipitation at ambient pressure. In a small-scale operation, pressurization may be achieved by the use of a hand pump. Pressurization levels between 10 psi and 120 psi have been found to significantly reduce both dissolved inorganic arsenic V & III species levels in anoxic and oxic aqueous solutions, however pressures between about 30 psi and about 60 psi are preferred for solutions with typical arsenic contamination. Accordingly, reaction velocities involving the particulation of the dissolved inorganic arsenic species may be dependent upon the pressure applied during the pressurization step. The less pressure utilized the slower the reaction kinetics and less efficient the overall removal of the dissolved arsenic III species. Overall removal of the indigenous dissolved inorganic arsenic V species is not adversely effected.

These processes may even be used for emergency water treatment in small, hand-pumped, pressure tanks. Likewise, these methods may be used for large-scale water treatment operations where hundreds of cubic feet per minute are treated. Elevated pressurization of the treated aqueous solution, followed by a period of time under ambient pressure, vastly accelerates the reaction kinetics of the precipitation-and-stabilization reaction within a treatment sequence involving pressure as an initial condition followed by depressurization to ambient pressure or within a treatment sequence including ambient pressure as an initial condition followed by pressurization then followed by depressurization to ambient pressure.

Accordingly, it is an object of some embodiments of the present invention to provide methods and apparatus for reducing the concentration of arsenic species, metallic ions, transition-metal and post-transition-metal elements, and ions and complexes in an aqueous solution.

It is another object of some embodiments of the present invention to provide methods and apparatus for reducing the concentration of both dissolved inorganic arsenic V and arsenic III species in an anoxic or oxic aqueous solution.

It is also an object of some embodiments of the present invention to provide methods and apparatus for improving the quality and potability of a water supply.

Another object of some embodiments of the present invention is to provide methods and apparatus for continuous in-stream reduction of the concentration of both dissolved inorganic arsenic V and arsenic III species in an anoxic or oxic aqueous solution.

A further object of some embodiments of the present invention is to provide methods and apparatus for batch-process reduction of the concentration of both dissolved inorganic arsenic V and arsenic III species in an anoxic or oxic aqueous solution.

A further object of some embodiments of the present invention is to provide methods and apparatus for continuous and batch-process reduction of the concentration of Sb, Se, Ba, Ag, Tl, Zn, Cd, Cr, Cu, Pb, Mn, Hg, Mo, Ni, and $PO_4^{-3}$ from aqueous solution.

These and other objects and features of the present invention will become more fully apparent from the following, description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 11 is flow chart showing a method of the present invention utilizing a combination of aeration, air injection and addition of a chemical oxidant;

FIG. 12 is flow chart showing a method of the present invention utilizing a combination of aeration and addition of a chemical oxidant.

DETAILED DESCRIPTION OF THE PREFERRED EMBODIMENTS

Figures 1A, 1B:
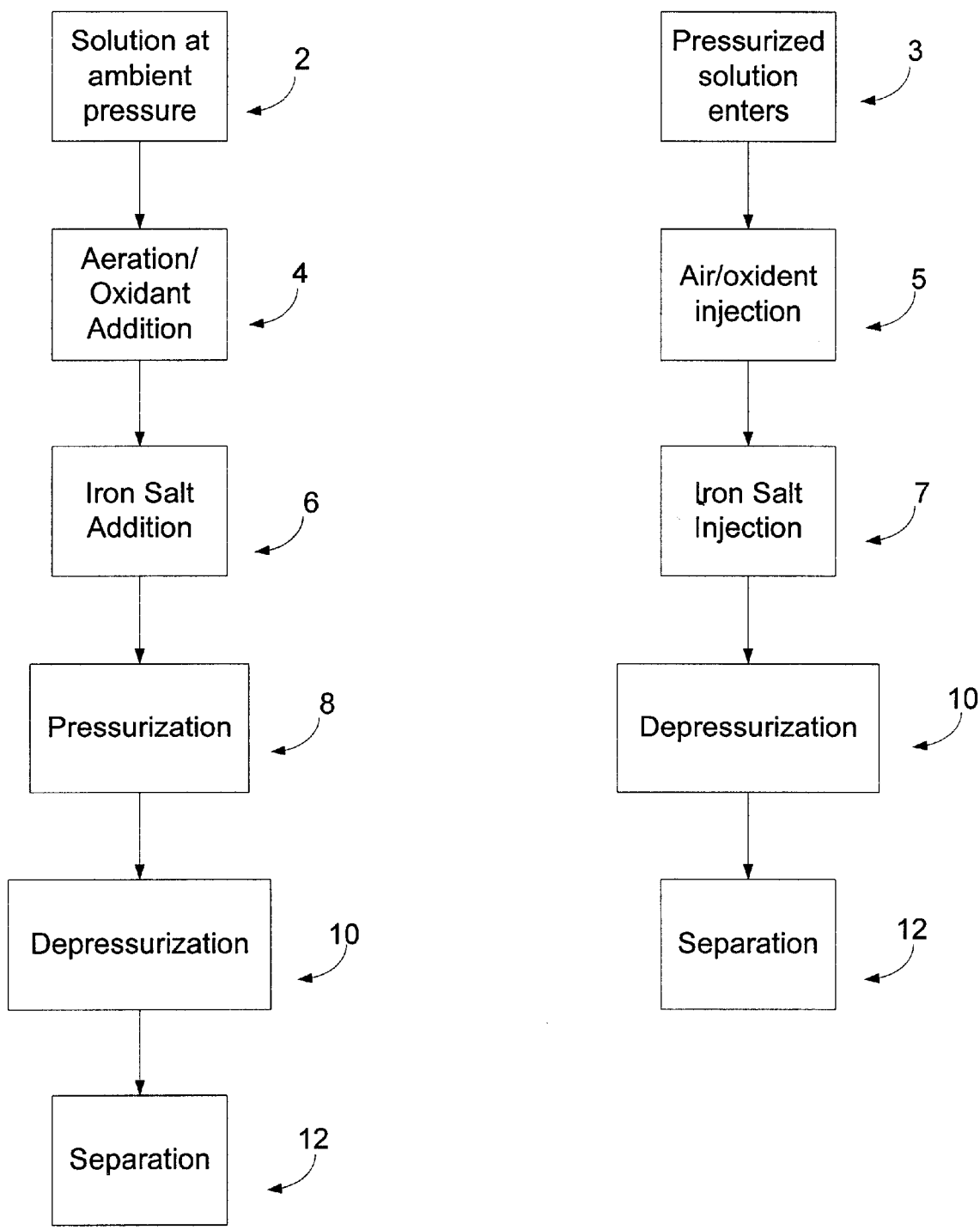
FIG. 1A is a flow chart showing the steps of a preferred method of the present invention wherein the contaminated solution enters the system at ambient pressure.
FIG. 1B is a flow chart showing the steps of a preferred method of the present invention wherein the contaminated solution enters the system at an elevated pressure.

The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the system and apparatus of the present invention, as represented in FIGS. 1 through 13, is not intended to limit the scope of the invention, as claimed, but it is merely representative of the presently preferred embodiments of the invention.

The currently preferred embodiments of the present invention will be best understood by reference to the drawings, wherein like parts are designated by like numerals throughout.

The removal of dissolved inorganic arsenic V species from varying water sources by either adsorption or co-precipitation with ferric hydroxides is an effective removal method that has yielded treated waters containing less than two parts per billion residual arsenic.

Numerous bench-level studies have been performed to identify treatment parameters necessary to produce the minimal residual arsenic in treated waters. These conditions include pH variations, varying iron salt concentrations, varying dissolved inorganic arsenic V concentrations, varying dissolved inorganic arsenic III concentrations, and identification of interfering/competing dissolved compounds (i.e. silicates).

Varying the previously mentioned test conditions, researchers have determined that iron III hydroxides are optimized in terms of adsorbing/co-precipitating dissolved inorganic arsenic V species when the aqueous arsenic-iron III hydroxide system has a pH of 4.5 and when ratios of iron to arsenic V are greater than unity. Substituting dissolved inorganic arsenic III species into the same system produces a vastly diminished efficiency in removal capability.

Test conditions having system pH's at near-neutral conditions show dissolved arsenic V species removal to be at a fraction of the removal efficiency of the system at the "4.5 pH" level. Additional testing substituting in dissolved inorganic arsenic III species showed arsenic removal was virtually nil.

Applying a portion of an embodiment of this invention, an aerated oxic solution at ambient pressure having a pH of 7 or slightly greater, containing approximately 100 parts per billion of an equal ratio of dissolved inorganic arsenic V & III species can be treated with as little as two mg iron per liter in the form of ferric chloride. The dissolved residual arsenic level of the treated water will be equal to or slightly greater than the original concentration level of the dissolved inorganic arsenic III species contained in the untreated water. This indicates that only the dissolved inorganic arsenic V species had been particulated.

The inclusion of the dissolved inorganic arsenic III species in bench-scale studies more closely resembles the arsenic profiles of anoxic water sources that require treatment prior to discharge into distribution systems of water municipalities. Removal of this species is critical to optimal overall arsenic concentration reduction.

Methods of embodiments of the present invention create amorphous iron III hydroxide particulates in neutral-pH waters being either anoxic or oxic, at ambient pressure or pressurized followed by depressurization. These methods perform at equal or better efficiency levels as the above mentioned "pH 4.5" created amorphous iron III hydroxide product.

An advantage of embodiments of the present invention is that the pH of the bulk solution remains virtually unchanged due to the small amount of iron (approximately two mg per liter as iron in the form of iron salts) added as part of the treatment requirements.

It is believed that in the methods of some embodiments of the present invention the amount of dissolved oxygen within a bulk solution treated by iron salts causes the amorphous structure of the iron III hydroxide to become structurally enhanced in terms of increased arsenic adsorption/co-precipitation capabilities.

It has been observed that aerated oxic waters having a neutral pH and treated with iron salts yield an orange colored iron III precipitate that acts as a flocculent and coagulates into large clumps as the water is allowed to become quiescent. Conversely, it has been observed that anoxic neutral waters when treated with iron salts do not produce an iron III hydroxide particulate as previously described but instead produce a dark-brown finely divided particulate that more resembles an iron-oxy-hydroxide precipitate that settles as a fine silt when the water is allowed to become quiescent.

Bench tests on the adsorption/co-precipitation capabilities of dissolved inorganic arsenic V species of these two iron particulates differ dramatically at ambient pressures or greater than ambient pressures. It is believed that the oxic created iron particulate far exceeds the adsorption/co-precipitation capabilities of the anoxic created iron particulate.

It is known that pressurized waters containing excess dissolved oxygen upon depressurization yield infinitesimally small air bubbles that virtually cling to all solid matter that they contact. It is believed that these evolving infinitesimally small oxygen bubbles become entrained within the structure of the iron III hydroxide particulate. This entrapment of oxygen bubbles onto the iron III hydroxide particulate may cause the creation of chemically active sites about the iron III hydroxide particulate to which dissolved arsenic V species are attracted and become attached thereto in a mechanism involving adsorption/co-precipitation.

Air agitated or open-air mechanically agitated waters having a near-neutral pH will also produce the same adsorptive enhanced iron III hydroxide particulate.

Anoxic waters containing dissolved inorganic arsenic III species when treated via the sequence of iron salt addition followed by pressurization, optional air injection, optional agitation and subsequent depressurization and filtration have yielded an arsenic residual less than two parts per billion. Indigenous dissolved inorganic arsenic III species within anoxic waters can be made to become particulate and removed by physical separation means from the bulk solution.

When iron salts are injected under pressure (about 30 psi or greater) into a pressurized solution having a pH of 7.4 and containing substantial amounts of dissolved oxygen the ORP of a discharging stream from the pressurized system into ambient pressure conditions is less than 200 mV. When this same treated water is filtered under pressure through a 2 micron filter cartridge, all injected iron and indigenous dissolved arsenic species pass through the filter indicating they are dissolved. However, when the depressurized treated water has experienced a short lapse of time at ambient pressures the turbidity of the solution increases rapidly to an end point (typically less than about 5 minutes) indicating particulation reactions have occurred and have been completed.

Simultaneous monitoring of the ORP of the depressurized treated water into ambient pressure conditions showed a rise over a short period of time (less than 5 minutes) from 190 mV to 280 mV.

Filtration techniques capable of removing particulate matter equal to or greater than 5 micron in size were used to filter the treated turbid water under ambient pressure conditions. Subsequent analyses of the filtered treated water samples confirmed that all previously dissolved iron and arsenic species were made particulate and easily separated from the bulk solution.

Published thermodynamic data for a low concentration level of an iron-arsenic-water system indicates that a solution having a pH greater than 7 but less than 8 requires a solution ORP greater than 200 mV in order to create an iron III hydroxide particulate. However, methods of the present invention employing direct injection of iron salts under pressure into a pressurized solution containing substantial amounts of dissolved oxygen followed by a short reaction period and depressurization followed by a short reaction period cause substantially all dissolved iron to be converted to an iron III precipitate that is physically enhanced to adsorb dissolved inorganic arsenic V species. The iron precipitates derived from this treatment sequence appear to be enhanced in terms of dissolved arsenic adsorptive/co-precipitative capabilities.

Dissolved iron III species act as an oxidant on dissolved inorganic arsenic III species within a redox reaction wherein dissolved inorganic arsenic III species are oxidized to form dissolved inorganic arsenic V species. It is believed that iron III salts injected under pressure into aerated pressurized solutions having neutral pH's will react to oxidize dissolved inorganic arsenic III species to form dissolved inorganic arsenic V species.

It is believed that dissolved iron III species closely associate with dissolved inorganic arsenic V species in aerated pressurized solutions at near-neutral pH. Upon introduction of the reacted pressurized solution to ambient pressure conditions, these reactants appear to readily combine to form a stable co-precipitate that is easily separated by physical means from the bulk solution.

The methods and apparatus of preferred embodiments of the present invention may be used to reduce or remove arsenic species from anoxic or oxic aqueous solutions from many sources. The terms "water" and "aqueous solution" may be used interchangeably to designate dilute streams of water with arsenic or other contaminants.

Dissolved inorganic arsenic is predominantly found in anoxic aqueous solutions in the form of As(III) and oxic aqueous solutions as As(V) species. A combination of the two dissolved arsenic species has been found in semi-oxic aqueous solutions where the indigenous pH was greater than 7 and having an ORP just greater than 250 mV. To efficiently achieve the lowest concentrations of dissolved inorganic arsenic species in treated solutions both species must be treated so as to cause them to become particulate. This in turn allows for ease of physical separation from the bulk solution while achieving a significant reduction in residual arsenic in the same. The introduction of iron salts at ambient pressure will significantly reduce the arsenic concentration of a solution, however, testing has shown that only As(V) has been removed significantly. To further reduce Arsenic concentrations, As(III) must also be removed. This may be achieved through the methods of embodiments of the present invention utilizing pressurization of the solution after introduction of various combinations of chemical oxidants, iron salts, aeration, and air injection followed by depressurization or introduction of various combinations of chemical oxidants, iron salts, and air injection during pressurization followed by depressurization.

As an example of the methods of embodiments of the present invention, a solution containing 55 ppb (parts per billion) of arsenic was treated. This example solution had a raw-water composition showing that 22 ppb of the 55 ppb was dissolved arsenic of which about 17–18 ppb was As(V) and about 4–5 ppb was As(III). The composition of this solution is shown in Table 1 below.

TABLE 1

Raw Water Composition

| Element or Species | Total, ppb | Dissolved, ppb |
|---|---|---|
| Arsenic - Total | 55 | 22 |
| As(V) |  | 17 to 18 |
| As(III) |  | 4 to 5 |

This solution was treated with ferrous iron at ambient pressure only, with initial brief stirring of the solution, then allowed to become quiescent through the remainder of the testing period. The reaction kinetics were observed and recorded in Table 2 below which is also shown in graphical form in FIG. 4.

TABLE 2

Ferrous Iron Treatment at Ambient Pressure

| | [As], ppb |
|---|---|
| Raw water | 55 |
| Treated water at 30 min | 6 |
| Treated water at 60 min | 4 |
| Treated water at 120 min | 5 |
| Treated water at 360 min | 4 |
| Treated water at 18 hr | 5 |

These results showed a significant reduction in arsenic concentration, however the concentration was never reduced below the amount present as As(III). This experiment supported the assertion that As(III) was not being precipitated from the solution, therefore, only As(V) had been precipitated. Further reduction of arsenic concentration was not achieved through either ferric or ferrous treatment at ambient pressures.

In contrast to the results produced at ambient pressures, arsenic concentrations were significantly reduced below those achieved at ambient pressure by the pressurized and aerated methods of embodiments of the present invention. Table 3, below, shows the results of the treatment of an aqueous solution using the methods and apparatus of a preferred embodiment of the present invention where Arsenic concentration was reduced to about 1 ppb. This sample was treated at a pressure of 35 psig, followed by a brief precipitation period at ambient pressure. Table 3 is shown in graphical form as FIG. 5.

TABLE 3

Ferrous Iron Treatment at Elevated Pressure, 35 psig

| Samples | [As], ppb |
|---|---|
| Raw water | 22.0[22] |
| Treated water at <1 min | 1.3 [1] |
| Treated water at 10 min | 1.3 [1] |
| Treated water at 20 min | 1.3 [1] |
| Treated water at 30 min | 1.3 [1] |
| Treated water at 40 min | 1.4 [1] |
| Treated water at 50 min | 1.3 [1] |
| Treated water at 60 min | 1.3 [1] |

These results, when compared with those listed in Table 1, indicate that treatment with iron salts at elevated pressure, followed by precipitation at ambient pressure, removed both dissolved As(III) and As(V), and yielded an effluent of higher quality and lower total arsenic concentrations than similar treatments carried out only at ambient pressure.

Arsenic III removal, in the processes of embodiments of the present invention, may be promoted by a change in the oxidation-reduction potential (ORP) of the aerated and pressurized, treated solution relative to the raw untreated solution. As shown in Table 4, below, the ORP is significantly increased via the addition of chlorine into the pressurized solution thereby promoting the oxidation and eventual particulation of the indigenous arsenic III species upon returning the treated bulk solution to ambient pressure conditions.

Table 4 indicates the ORP of a depressurized solution originally pressurized, aerated, and treated via an embodiment of this invention that includes the use of the injection of a ferric chloride solution under pressure into the pressurized system. Additionally, chlorine was added as an oxidant. The resulting residual dissolved arsenic in the bulk solution is shown in Table 4 below. Table 4 is shown in graphical form in FIG. 6.

TABLE 4

Continuous in-flow process, Ferric Iron Treatment at Elevated Pressure, Chlorine as oxidant, 45 psig

| Samples | ORP, mV (Ag-AgCl Reference) | Dissolved [As V], ppb | Dissolved [As III], ppb |
|---|---|---|---|
| Raw water | 270 | 22 | 4 |
| Treated water at 150 min | 730 | <1 | <1 |
| Treated water at 180 min | 700 | <1 | <1 |
| Treated water at 210 min | 720 | <1 | <1 |
| Treated water at 240 min | 720 | <1 | <1 |
| Treated water at 5 hr | 720 | <1 | <1 |

To further demonstrate the characteristics of embodiments of this invention, a concurrent filter cartridge capable of filtering particulate matter equal to or greater than 5 micron in size was utilized. A pressurized stream of the above described solution was filtered in real time and later evaluated for total and dissolved arsenic. The results of those analyses are found in Table 5 below.

TABLE 5

Continuous in-flow process, Ferric Iron Treatment, Elevated Pressure, Chlorine as oxidant, 45 psig

| Samples | ORP, mV (Ag-AgCl Reference) | Dissolved [As V], ppb | Dissolved [As III], ppb | Particulate [As], ppb |
|---|---|---|---|---|
| Raw water | 270 | 17 | 4 | 34 |
| Treated water at 60 min | 730 | <1 | <1 | 22 |
| Treated water at 120 min | 700 | <1 | <1 | 20 |
| Treated water at 180 min | 720 | <1 | <1 | 23 |
| Treated water at 240 min | 720 | <1 | <1 | 21 |
| Treated water at 300 min | 720 | <1 | <1 | 21 |

To further demonstrate the characteristics of the embodiments of this invention, an ambient pressurized stream of the above described solution was aerated, and injected with the same ferric chloride solution. The solution was then immediately pressurized in a continuous in-flow reaction vessel providing a reaction holding time of 5 minutes prior to direct filtration under continued pressure. The results of this evaluation are as follows in Table 6 below.

TABLE 6

Ferric Iron Treatment at Elevated Pressure, 45 psig

| Samples | Total [As], ppb | Dissolved [As], ppb |
|---|---|---|
| Raw water | 55 | 17 |
| Treated water at 1 hr | 4 | 4 |
| Treated water at 2 hr | 4 | 4 |
| Treated water at 3 hr | 3 | 3 |

As an example of the methods of embodiments of the present invention, an additional solution containing 85 ppb (parts per billion) of arsenic was treated via a continuous in-flow rate of 500 gallons per minute at constant pressure of 45 psi. A ferric chloride solution was injected under pressure into the pressurized aerated solution. This example solution has a raw water composition showing that 75 ppb of the 85 ppb was dissolved arsenic of which about 70–71 ppb was As(V) and about 4–5 ppb was As(III). The composition of this solution is shown in Table 7 below.

TABLE 7

Raw Water Composition

| Element or Species | Total, ppb | Dissolved, ppb |
|---|---|---|
| Arsenic - Total | 85 | 75 |
| As(V) | | 70 to 71 |
| As(III) | | 4 to 5 |

Arsenic [III] removal is also achieved in the processes of embodiments of the present invention by utilizing pressure to increase the amount of dissolved oxygen contained within the solution and by eliminating the addition of other chemical oxidants. Monitoring of the solution ORP of a discharge stream from the pressurized system showed a constant ORP of 190 mV. Continued monitoring of a quiescent portion of the depressurized treated water at ambient pressure conditions showed a rise in solution ORP from 190 mV to 280 mV within 5 minutes.

Subsequent analyses of the filtered treated water samples found in Table 8 below confirmed that all previously dissolved inorganic arsenic V & III species were made particulate and easily separated from the bulk solution.

TABLE 8

Continuous in-flow treatment, Ferric Iron Treatment, Elevated Pressure, 45 psig

| Samples | ORP, mV (Ag-AgCl Reference) | Dissolved [As V], ppb | Dissolved [As III], ppb |
|---|---|---|---|
| Raw water | 280 | 71 | 4 |
| Treated water at 60 min | 190 | 71 | <1 |
| Treated water at 120 min | 190 | <1 | <1 |
| Treated water at 180 min | 190 | <1 | <1 |
| Treated water at 240 min | 190 | <1 | <1 |
| Treated water at 300 min | 190 | <1 | <1 |

To further demonstrate the characteristics of embodiments of this invention, a concurrent filter cartridge capable of filtering particulate matter equal to or greater than 5 micron in size was utilized. A pressurized stream of the above described solution was filtered in real time and later evaluated for total and dissolved arsenic. The results of those analyses are found in Table 9 below.

TABLE 9

Continuous in-flow treatment, Ferric Iron Treatment, Elevated Pressure, Elevated dissolved oxygen, 45 psig

| Samples | ORP, mV (Ag-AgCl Reference) | Dissolved [As V], ppb | Dissolved [As III], ppb | Particulate [As], ppb |
|---|---|---|---|---|
| Raw water | 280 | 71 | 4 | 10 |
| Treated water at 60 min | 190 | <1 | <1 | 73 |
| Treated water at 120 min | 190 | <1 | <1 | 68 |
| Treated water at 180 min | 190 | <1 | <1 | 77 |
| Treated water at 240 min | 190 | <1 | <1 | 72 |
| Treated water at 300 min | 190 | <1 | <1 | 81 |

These examples show that absent the effects of pressurization of the solution, conditions are not sufficient to promote insolubilization of arsenite species. Therefore, complete insolubilization, or values close thereto, cannot be achieved without pressurization and subsequent depressurization of an iron-injection process. This is thought to be due to the additional oxidation and precipitation of the indigenous As(III) species from the solution which does not occur in iron-treatment methods carried out at ambient pressure only.

Accordingly, methods and apparatus of embodiments of the present invention provide more complete arsenic reduction and produce a more purified solution than known iron-treatment methods.

In reference to FIG. 1A, a preferred process of embodiments of the present invention is illustrated in flow chart form. Water contaminated with dissolved inorganic arsenic species or other contaminants 2 enters an apparatus of the present invention from a well, reservoir, holding pond, river, factory effluent, or any other source of water or aqueous solution. Treatment of the contaminated aqueous solution may begin at ambient or elevated pressure, however, in the process illustrated in FIG. 1A, the solution enters the system at ambient pressure.

The solution may be oxygenated at this point, or chemical oxidants may be added 4. Air pumps or other means may be employed to force one or more streams of air into the solution for aeration. Agitation methods may also be used. Air pressure and volume should be sufficient to aerate the solution. Naturally-aerated solutions, e.g., from surface waters or streams may not require aeration.

Iron salts are added 6 to the solution. Depending on the specific apparatus used, iron salts may be added in several ways. In a preferred continuous, in-flow method, the salts are added as a salt solution that is pumped into the aqueous solution to be treated. Iron additions of as little as 2 mg/L are typically sufficient using the methods of embodiments of the present invention for typical dissolved inorganic arsenic V species concentrations. For batch processes, the iron salts may be added in solid form so long as they are allowed to dissolve sufficiently.

If the incoming solution is not pressurized, as in the exemplary method of FIG. 1A, pressurization 8 occurs immediately after the addition of iron salts. Pressures of about 10 psi to about 120 psi have been found to be adequate to promote insolubilization of arsenic species. While higher pressures may be beneficial, pressures of about 30 psi to about 45 psi are sufficient and preferred for typical potable water solutions with typical dissolved inorganic arsenic V species concentrations. Pressurization may be achieved by pumping the solution against a pressure valve, orifice, filter or many other known techniques. A pressure tank may be used in this process, however, a tank is not needed so long as the pressure is elevated to the prescribed level for a sufficient period of time. Other methods may also be used to increase solution pressure. When pumping power is not available or uneconomical for an in-flow process, an inverted siphon, water tower or other means will suffice. For a batch process, a pump may also be used to increase pressure. Small batch process methods, especially those used for small-scale emergency treatment of water, may even use hand-pump pressurization.

Pressurization need not be maintained for sustained periods. Instantaneous pressurization may be sufficient to achieve many concentration reduction levels. However, in a preferred embodiment used for removal of arsenic species, pressurization is maintained for a reaction period of about 45 seconds to 2 minutes or more to ensure that adequate amounts of arsenic will be precipitated and stabilized. Pressurization periods of 1 second to 2 minutes have been found to be particularly successful in removing arsenic species, however longer periods may prove beneficial in precipitating some contaminant species.

Depressurization 10 or a return to ambient pressure conditions occurs after the pressurized reaction period. The ambient-pressure precipitation period may range from a few seconds to 45 minutes, but a preferred embodiment, used for the removal of arsenic species, employs a reaction period of about 1 to about 5 minutes to allow precipitates to form. Depending on the concentrations of contaminant species, the oxygenation level of the water, the amount of iron introduced into the solution and other factors, the ambient-pressure precipitation period may vary over a wide range. Currently preferred methods typically range between about 1 minute and about 45 minutes After the solution has undergone a pressurized reaction period 8 followed by an ambient reaction period 10, the contaminant species may be removed through common separation techniques 12. Conventional pressure and gravity filtration methods, sedimentation, centrifugation and other separation methods are all adequate for separation of the precipitates so long as they remove the size of particles generated in the precipitation process. The mean particle size is thought to be about 6 microns for arsenic species precipitated with iron. In a preferred embodiment of the present invention, a five-micron-rated filter, such as a pressurized granular-media filter, is used to remove precipitated solids in a continuous in-flow process.

An alternative process of some embodiments of the present invention, as shown in FIG. 1B, begins with a contaminated solution in a pressurized state 3. Many systems may require pumping of water, either from a subterranean source, a source at a lower elevation than the treatment facility or for some other reason. When this is the case, pressurized water may enter the system 3 of embodiments of the present invention directly without depressurization. Air may be injected into the pressurized solution or a chemical oxidant may be injected 5 when the solution is not sufficiently oxygenated.

Iron salt 7 is also added to the solution, preferably by injection of a saline solution. Once oxidants and salts have been added, the contaminated solution is held at pressure for a pressurized reaction period before depressurization 10. After depressurization, the contaminated solution is held at ambient or near-ambient conditions for an ambient or depressurized reaction period before separation 12 of precipitates and solids.

Some methods of the present invention may use a pressure filter through which the treated solution is forced. With some filters, adequate flow rates may only be maintained when sufficient pressure is developed against the filter. These methods may require re-pressurization of the treated solution. Other separation methods that do not require re-pressurization include, but are not limited to clarifier ponds, mechanical clarifiers and other methods. Either method is generally adequate for removal of the precipitates.

Once the precipitates are separated, the methods of embodiments of the present invention are complete, however, further treatment using other processes may occur in conjunction with these inventive processes. In many applications where arsenic species are treated, the resulting concentration level will be less than 5 ppb, well below most current standards.

Figure 2:
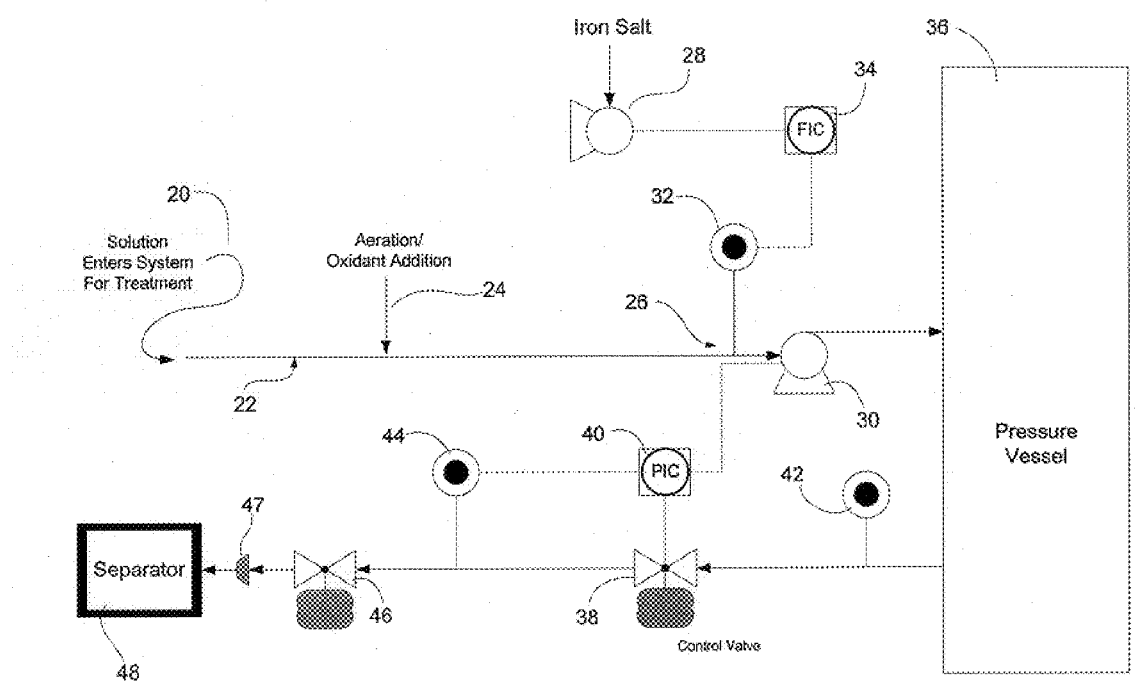
FIG. 2 is a diagram showing the typical elements of a continuous in-flow apparatus of the present invention.

In a preferred continuous, in-flow embodiment of the present invention, as shown in FIG. 2, a continuous flow of contaminated aqueous solution 20 enters a primary flow conduit 22 which may be a pipe, channel or other device which carries the solution to an optional aeration or oxygenation area 24 where air may be pumped into the solution or oxidants may be added thereto when the solution is not sufficiently oxygenated before treatment. Adjacent to this location 24, is a reagent injection point 26, where a concentrated solution of iron salts or a combination of iron salts and chemical oxidants may be injected into the contaminated solution. This solution may be added in a variety of ways, but a preferred embodiment employs an electric pump 28 to inject the reagent solution directly into the contaminated stream. Iron additions of about 2 mg of Fe per liter of treated solution are sufficient for typical precipitation processes with typical arsenic concentrations found in potable water sources.

The correct ratio of iron salt to contaminated solution may be regulated automatically through the use of a flow sensor 32 located in or in communication with primary flow conduit 22. Flow sensor 32 may be connected to an injection controller 34 which, in turn, controls the amount of reagent or reagent/oxidant pumped into the contaminated solution by injection pump 28. The control, interaction and communication between sensor 32, controller 34 and injection pump 28 may be achieved in various ways known in the art so long as correct amounts of iron salt are metered and matched to various flow rates of contaminated solution. Various connections and transmitters may be used for interconnection of sensor 32, controller 34 and injection pump 28. Pressure valves and other devices may also be used to regulate the flow of reagent solution or salt so that correct amounts are added to the solution. For solutions containing arsenic concentrations of about 20 to about 60 ppb, iron salts (i.e., $FeCl_2$, $FeCl_3$, $FeSO_4$ and others) are typically added into the solution to obtain a concentration level of about 2 mg to about 4 mg of iron per liter of treated water.

Immediately after any optional aeration and/or reagent injection, the solution is pressurized to between about 10 psig to about 120 psig and preferably to between about 30 psig and about 40 psig. While this pressure level has proven to be adequate for inducing precipitation of As(III) and is easily achievable, lesser and greater pressures will prove adequate in many applications. Pressurization, in this embodiment, is achieved with a primary solution pump 30, which pumps the solution into a pressure vessel 36. Pressure vessel 36 may be a holding tank designed to maintain pressure for a given period of time as the solution is pumped through the system or it may also serve the purpose of surge protection or other capacity requirements. Pressure vessel 36 may be a separate structure such as a tank or other device which holds a large volume of solution or it may simply be a section of pipe or other pressure conduit which connects solution flow from pump 30 to a pressure regulator 38 such as a control valve. In embodiments of the present invention, pressure vessel 36 will be designed to maintain pressure throughout a pressurized reaction period.

Pressure regulator 38 maintains sufficient pressure in pressure vessel 36 to promote precipitation of the arsenic species. Pressure regulator 38 may be an electronically controlled valve or some other device which is capable of varying the flow, friction or other characteristic to maintain pressure in vessel 36. Pressure regulator 38 may be connected to sensors 42 or 44 which may signal and control regulator 38 or pump 30 so as to maintain a given pressure, pressure range or pressure profile.

Depressurization valve 46 allows for depressurization of the solution before separation of particulates. Separator 48 removes particulates from the solution and, in preferred, embodiments will allow the solution to remain at ambient pressure for an ambient reaction period suitable for the contaminant being removed. An ambient vessel, such as a tank 47 may be used to maintain ambient pressure during the ambient reaction period. Some preferred embodiments employ a five-micron rated, granular-media or pressure filter as a separator 48 for separation of precipitates from the solution.

Once the precipitates have been separated, the processes of embodiments of the present invention are complete and the treated solution is ready for use or further treatment of other kinds.

Figure 3:
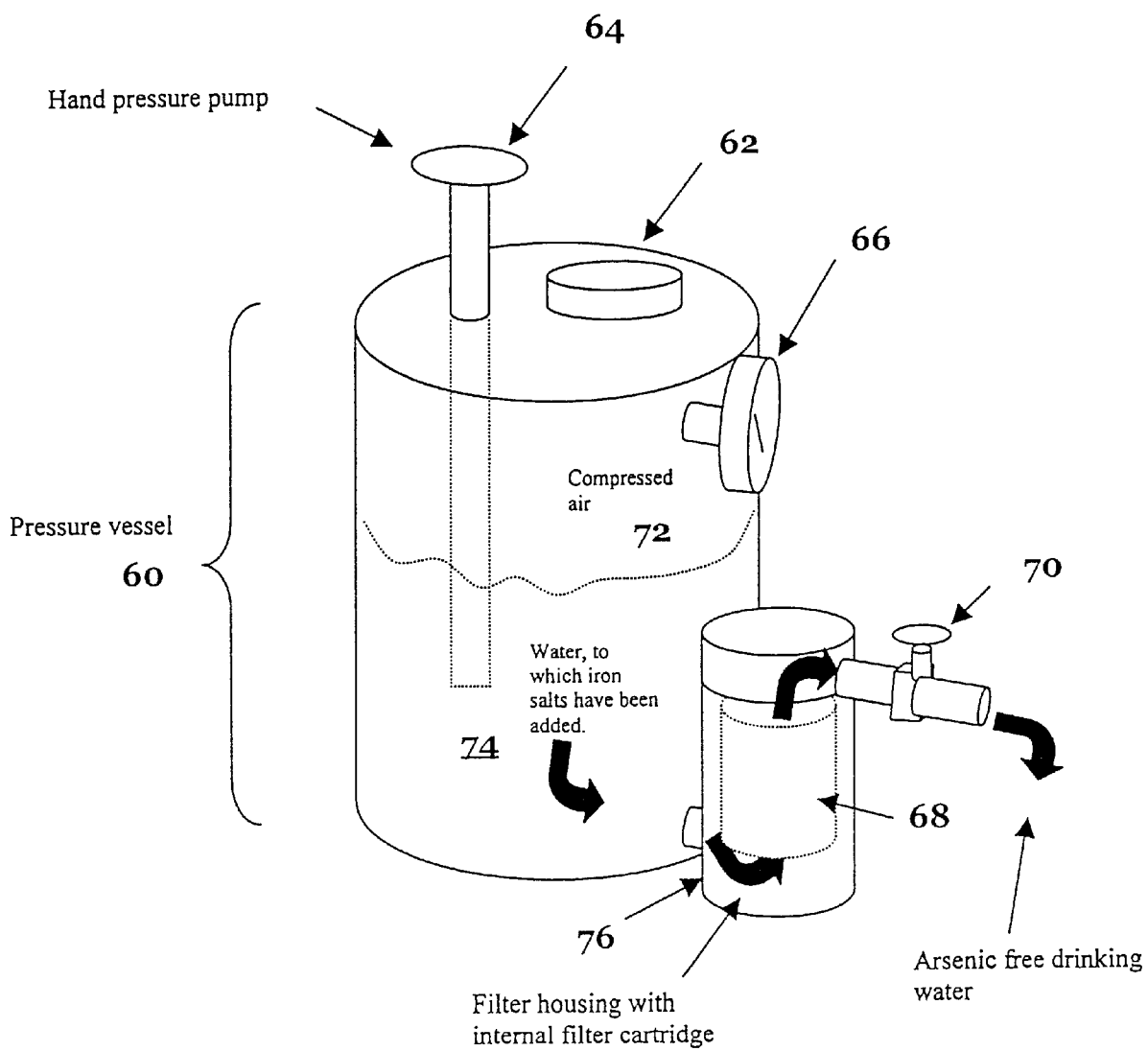
FIG. 3 is a perspective view of a batch process apparatus of the present invention.
Figure 4:
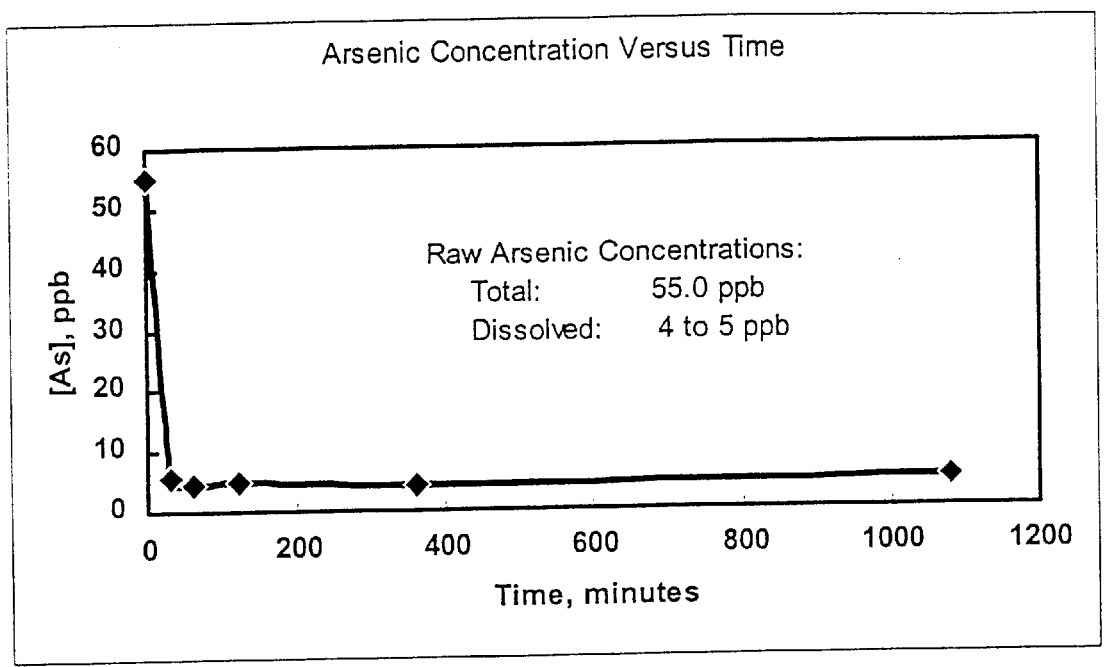
FIG. 4 is a graph showing arsenic concentrations versus time for a sample treated by known methods.
Figure 5:
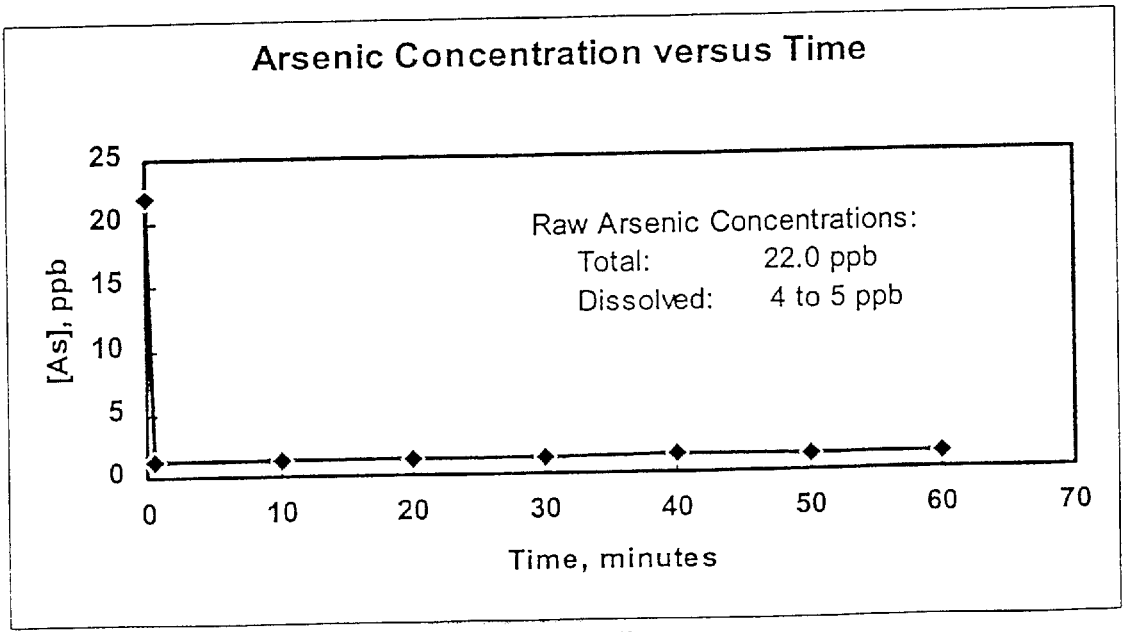
FIG. 5 is a graph showing arsenic concentrations versus time for a sample treated by a method of the present invention.
Figure 6:
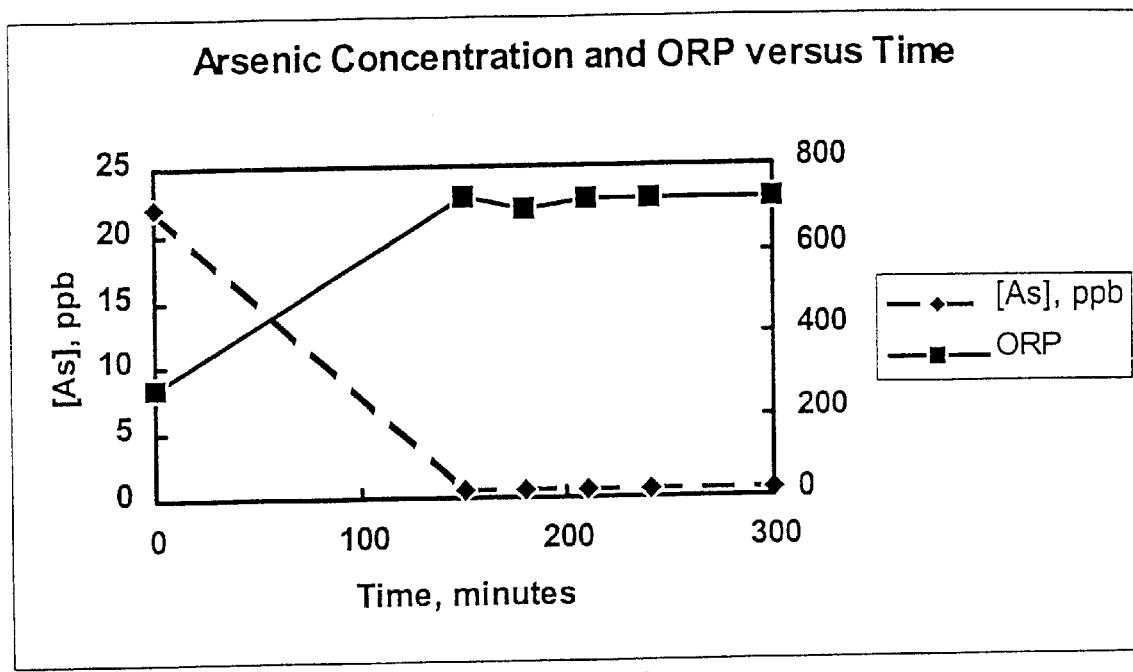
FIG. 6 is a graph showing arsenic concentration versus time and ORP for a sample treated by a method of the present invention.

Another embodiment of the present invention, shown in FIG. 3, utilizes a batch-process to treat contaminated solutions. This embodiment utilizes a pressure vessel 60 with a removable lid 62 which is removable for filling vessel 60. Lid 62 may be secured to vessel 60 so that vessel 60 may be pressurized during processes of the present invention. This embodiment also comprises pump 64, such as a hand pump, which may be used to pressurize vessel 60. A pressure gauge 66 may be used to monitor pressure in vessel 60 and to ensure that solution 74 has reached and maintained sufficient pressure to complete the process. Liquids may leave pressure vessel 60 through conduit 76 which connects vessel 60 to filter 68.

Filter 68 may be constructed in a variety of types which are capable of separating iron/arsenic precipitates from solution. Two-micron rated filters of the granular-media or pressure type have worked well in this application.

Valve 70 may be used to maintain pressure in vessel 60 and regulate flow of solution through filter 68 to the exterior of vessel 60. Valve 70 is not necessary for implementation of the present invention but adds convenience and functionality to some embodiments.

This batch-process embodiment of the present invention may be used by partially filling vessel 60 with an arsenic-contaminated or otherwise contaminated solution 74. Sufficient air 72 is left in vessel 60 to properly aerate solution 74. Iron salts may be added to solution 74 before filling vessel 60 or they may be added into vessel 60. Iron salts may be added in solid or concentrated solution form so long as adequate salts are added to promote precipitation of the contamination species in the solution.

Solution 74 may be aerated by shaking and swirling the solution while in vessel 60 or solution 74 may be aerated prior to filling vessel 60.

Once solution 74 has been aerated and mixed with iron salts, solution 74 must be pressurized. This may be effectuated through the use of pump 64 which may be an attached hand pump or other means of pressurizing vessel 60. An independent compressor, bicycle pump, spare tire or other means of pressurization may also be used to pressurize the vessel of embodiments of the present invention. Pressurization may be verified by observation of gauge 66 which may be read visually or may be accompanied by an audible or visual alarm. Gauge 66 may also be an electronic or other automatic device which signals the user when the proper pressure level has been achieved and any necessary pressurized reaction period has lapsed. In preferred embodiments, a pressurized reaction period of about 5 minutes is typically adequate.

After the pressurized reaction period has been met, the solution is depressurized by opening valve 70 or simply by opening lid 62. Other depressurization methods may also be used. An ambient reaction period must be observed before filtration or separation so a user must take care to ensure that the solution does not pass through filter 68 until after the ambient reaction period. In the example embodiment illustrated in FIG. 3, this may be achieved by slowly removing lid 62 or by tilting vessel 60 so that valve 70 is at the top of the vessel 60 thereby allowing only pressurized air to pass through filter 68 during depressurization.

Once the proper reaction periods have been met, solution 74 may be allowed to exit vessel 60 through conduit 76 and through filter 68 which filters any precipitates and solids from solution 74. Valve 70 may be used to regulate flow from vessel 60. Valve 70 may be a hand operated valve which is used to manually control flow from vessel 60. Valve 70 may also be an automatic valve which may operate in conjunction with gauge 66. When the proper reaction periods are achieved, valve 70 may open automatically to effectuate depressurization also. Valve 70 may be used as a safeguard to ensure that proper pressurization has been achieved prior to exit of solution 74 from vessel 60.

After pressurization of solution 74 in vessel 60 and separation of precipitates, solution 74 is fully treated and ready for use. Any arsenic species present in solution 74 prior to treatment will be reduced to an almost imperceptible level which is well below current standards. Arsenic concentrations are successfully reduced to a level between about 1 ppb and about 5 ppb.

Further embodiments of the present invention may employ additional or alternative oxygenation, pressurization and depressurization techniques or other methods of promoting precipitation of arsenic species. Promoting precipitation of arsenic species may comprise increasing the rate of reaction as well as decreasing the final concentration of arsenic species in a solution.

One step used in embodiments of the present invention to promote contaminant precipitation is the addition of a chemical oxidant to the solution to be treated. Oxidant addition may take place before, during or after the addition of iron salts and may occur before or during pressurization. Preferably, chemical oxidants are added simultaneous to the addition of iron salts. Some chemical oxidants suitable for the methods of the present invention include, but are not limited to, hydrogen peroxide, ozone, chlorine, sodium hypochlorite, potassium hypochlorite, calcium hypochlorite, potassium permanganate and others.

Addition of chemical oxidants to the solution may be performed in addition to aeration and/or air injection of the solution. Oxidant addition may also replace either or both of the aeration and air injection steps when conditions permit. For solutions with high arsenic concentrations and high concentration of As(III) a combination of ambient aeration, air injection, and addition of chemical oxidants may be required to achieve suitable reaction rates and final concentration levels. In-flow systems with high flow rates and limited reaction times may also require combinations of the above oxygenation steps for complete treatment.

In all parts of this document including the specification and claims, the term "oxygenation" shall comprise the processes of aeration, air injection and addition of chemical oxidants.

Figures 7, 8:
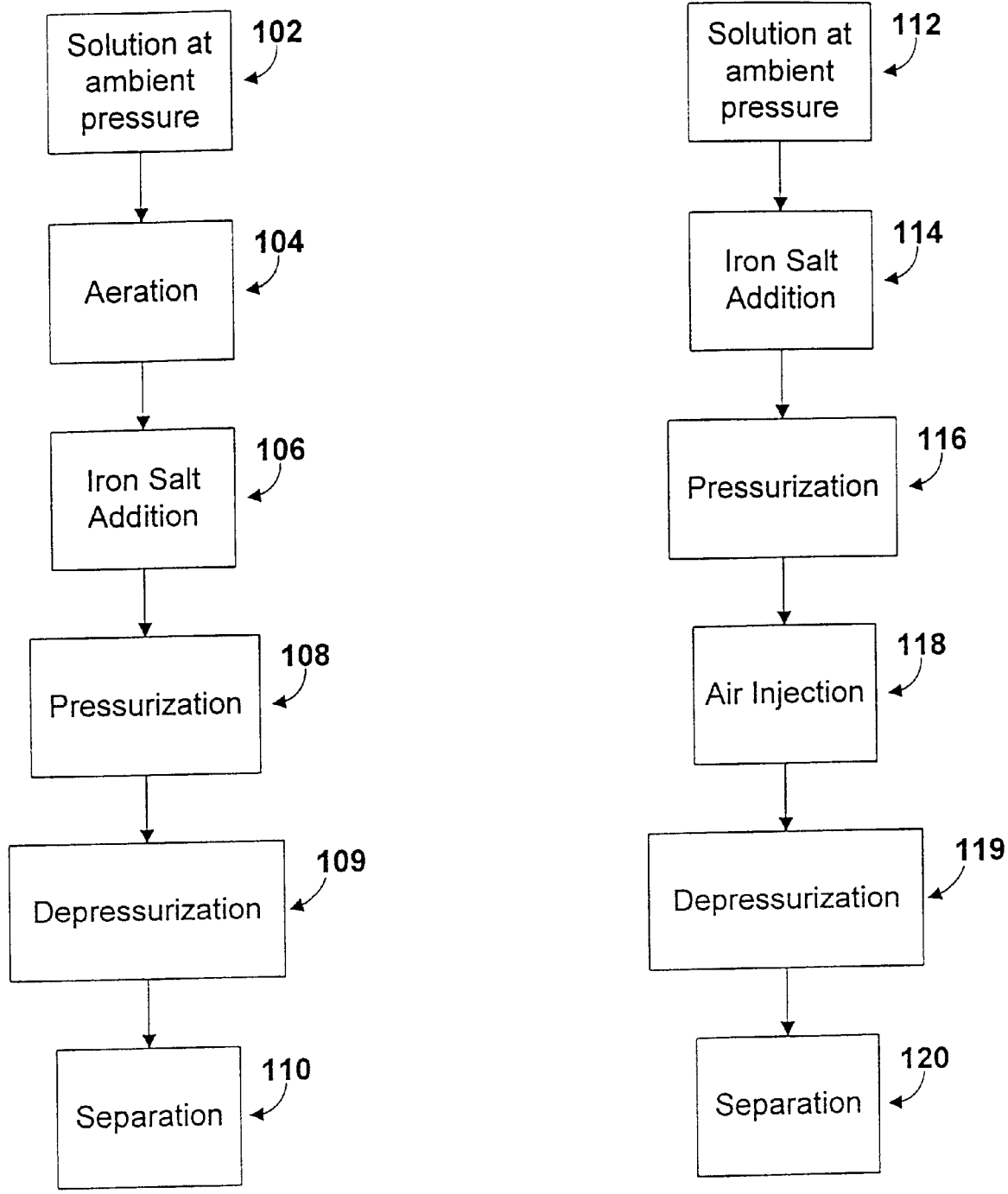
FIG. 7 is flow chart showing a method of the present invention utilizing aeration.
FIG. 8 is flow chart showing a method of the present invention utilizing air injection.

In reference to FIG. 7, the method of a first embodiment of the present invention comprises the steps of providing a solution to be treated at ambient conditions 102 which include ambient pressure. The solution may naturally occur at ambient pressure, be transported to the treatment location at ambient pressure or may be transported through pressure piping after which it is allowed to return to ambient pressure.

The solution may then be aerated 104 using agitation, air nozzles or other means. One or more iron salts are then added 106 to the solution. Preferably, salts may be added by pumping a concentrated salt solution into the solution to be treated, however, when time permits the salts may be added in solid form or by other methods. Pressurization 108, preferably, takes place after or during salt addition. In preferred embodiments, pressurization will be maintained for a pressurized reaction period of adequate for removal of the targeted contaminants. After pressurization, arsenic species will be allowed to precipitate from the solution and will exist as solids which can be separated from the solution. This precipitation may occur almost instantaneously upon depressurization 109, for some concentrations of some species of arsenic, however other species and concentrations thereof may require an ambient reaction period. This reaction period will preferably last about 1 to 5 minutes to ensure complete precipitation of all arsenic species. A different duration may be necessary for other contaminants. When precipitation is complete, the precipitates are separated 110 using techniques known in the industry. Known separation techniques include, but are not limited to, filtration, sedimentation, centrifugation and others. Separation may take place before or after the treated solution returns to ambient pressure. Once precipitates have been removed the solution will have a drastically reduced or negligible arsenic concentration.

In reference to FIG. 8, the method of a second embodiment of the present invention comprises the steps of providing a solution to be treated at ambient conditions 112 including bringing the solution to ambient pressure as described above. Once ambient conditions have been reached, one or more iron salts are added 114 as explained above. The salt-doped solution is then pressurized 116. During the pressurized state, air is injected 118 into the pressurized solution for a portion of or all of the pressurized reaction period. The solution is then allowed to depressurize 119 for whatever ambient reaction period is required for contaminant precipitation. Precipitates forming in the solution are then separated 120 and the treated water is used for its intended purpose.

Figure 9:
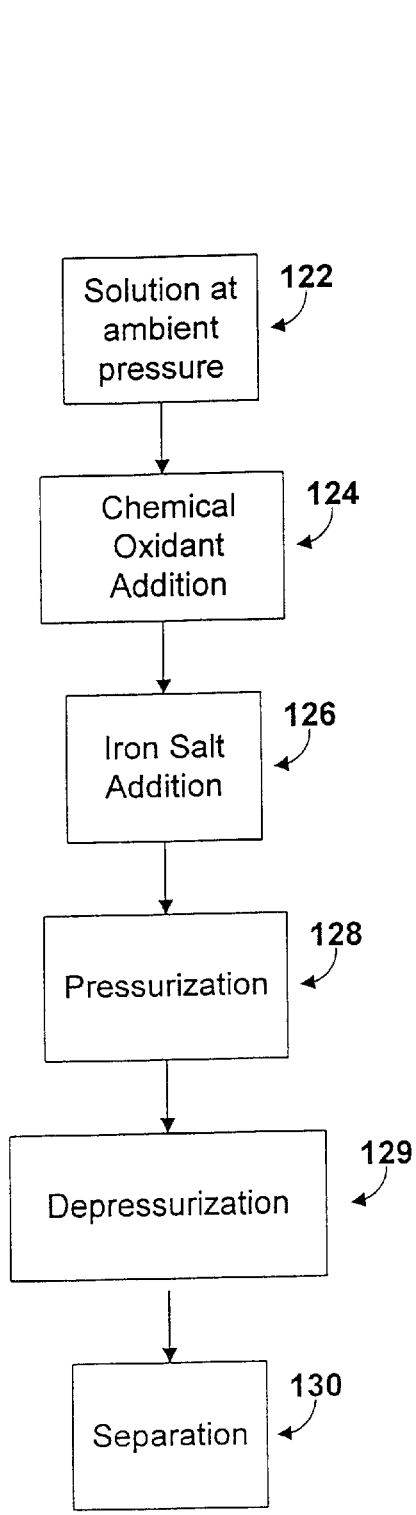
FIG. 9 is flow chart showing a method of the present invention utilizing addition of a chemical oxidant.

In reference to FIG. 9, the method of a third embodiment of the present invention is described. This third embodiment comprises a further method of arsenic removal comprising a step of providing a solution to be treated at ambient pressure 122 followed by the addition of a chemical oxidant 136 to promote precipitation of arsenic species. At least one iron salt is also added 126 to the solution. The iron salt may be added simultaneously with the chemical oxidant or it may be added before or after the chemical oxidant as dictated by the economics or logistics of the specific application. The solution is pressurized 128. Pressurization typically occurs after addition of the salts and any chemical oxidants because it is generally more convenient to add the chemicals at ambient conditions, however, when conditions permit, salts and oxidants may be added while the solution is in a pressurized state. After a period of pressurization 128 that allows for chemical reaction, the solution is depressurized 129 to a lower pressure, preferably near ambient conditions, however, in some cases, any pressure between the pressurized state and ambient pressure may prove adequate. This condition is maintained for a depressurized reaction period to allow precipitation to occur after which precipitates are removed 130 from the solution.

When time constraints require quicker reaction times or when high concentrations of arsenic are present, reaction kinetics may be accelerated by combinations of the above described methods.

Figure 10:
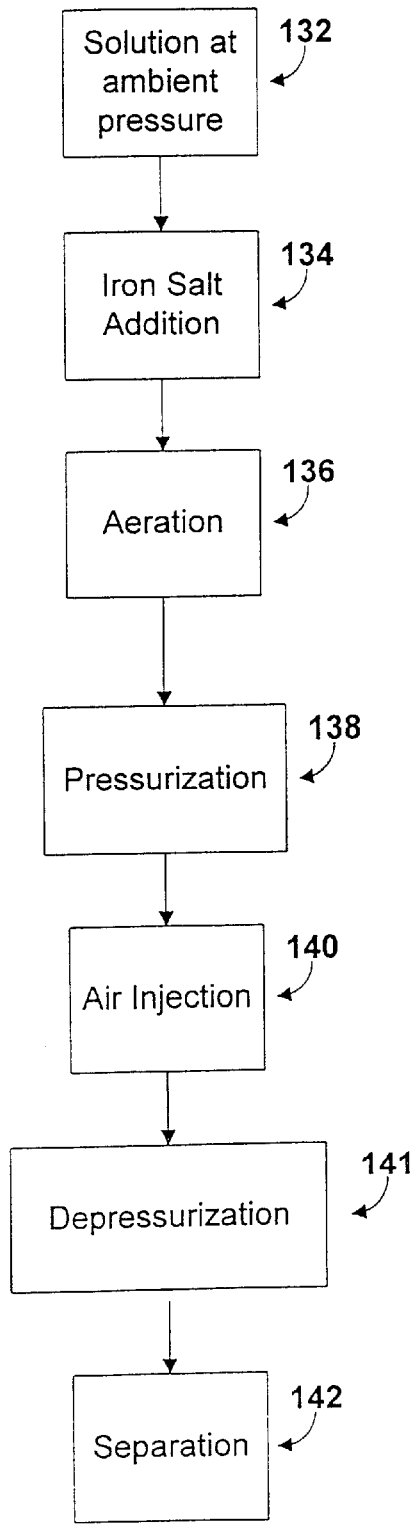
FIG. 10 is flow chart showing a method of the present invention utilizing a combination of aeration and air injection.

In reference to FIG. 10, the method of a fourth embodiment of the present invention is described which combines aeration and air injection in a single method. In this process, a solution is brought to ambient conditions 132 as described above. Iron salt is then added 134 and the solution is aerated 136 as in the first embodiment. The solution is then pressurized 138. The exact sequence of salt addition, aeration and pressurization may change according to the physical layout of the treatment facility. For best results, aeration will occur before pressurization. Salt addition may occur before or after aeration. After pressurization 138, air is injected 140 into the pressurized solution. Pressure is maintained for whatever pressurized reaction period is necessary and the solution is depressurized 141. This is followed by a depressurized reaction period to allow for complete precipitation of the species, followed by separation 142 of precipitates in the solution. This combination method generally provides quicker reaction times and more complete reduction of contaminant concentrations.

In reference to FIG. 11, the method of a fifth embodiment of the present invention is described which combines the steps of aeration, air injection and the addition of a chemical oxidant. This method begins with a solution to be treated being brought to ambient pressure 152. Iron salt is then added 154 as described above. A chemical oxidant is also added 156 to the solution and the solution is aerated 158. The solution is pressurized 160 followed by air injection into the solution while it is pressurized 162. Depressurization 161 then occurs followed by separation of the precipitates 164 formed in the process. Pressures are maintained for proper reaction periods as described above.

A further combination method is described in FIG. 12, where the method of a sixth embodiment of the present invention is depicted. This method also begins with a contaminated solution at ambient conditions 166 to which at least one iron salt is added 168 as described above. A chemical oxidant is also added 170 and the solution is aerated 172 followed by pressurization 174 for a prescribed period. The solution is then depressurized 175 for a prescribed period and precipitates are separated 176 from the solution to complete the process. Pressures are maintained for proper reaction periods as described above.

Figure 13:
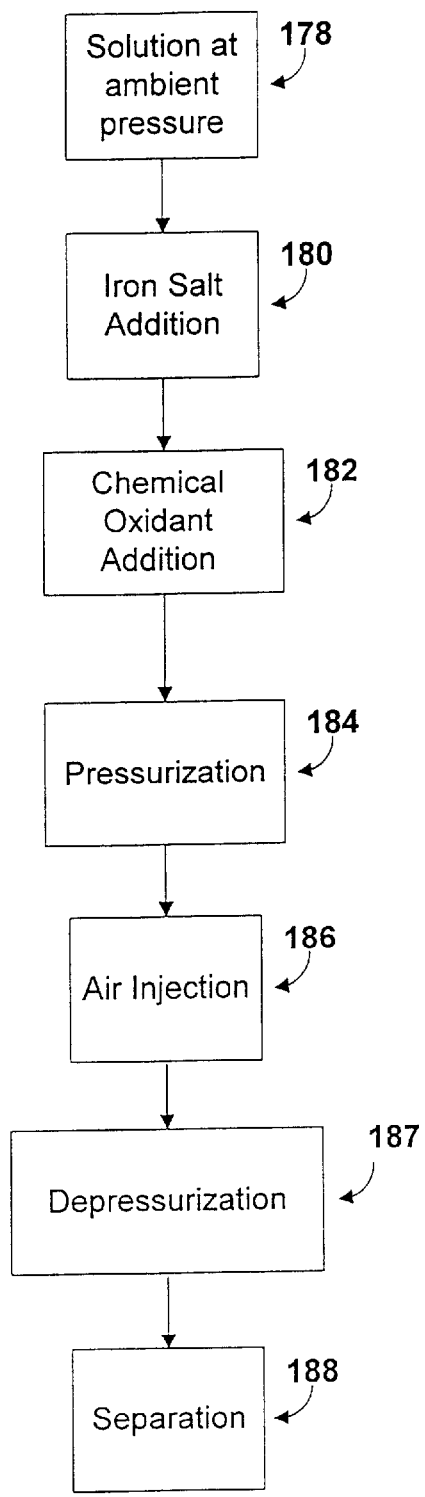
FIG. 13 is flow chart showing a method of the present invention utilizing a combination of air injection and addition of a chemical oxidant.

A still further combination method of the present invention, as depicted in FIG. 13, comprises the steps of bringing a contaminated solution to ambient pressure 178 followed by the addition of at least one iron salt 180 along with the addition of a chemical oxidant 182. The chemically-doped solution is then pressurized 184 and air is injected 186 into the solution while the solution is in a pressurized state. Depressurization 187 then takes place for a prescribed period. Precipitates formed in the process are separated 188 from the solution to complete the process.

It should be noted that any of the above described processes may begin with a solution in a pressurized state wherein iron salts are added and any appropriate oxygenation steps are applied followed by an appropriate pressurized reaction period and subsequent depressurization for a depressurized reaction period followed by separation of solids and precipitates.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

I claim:

1. A method of precipitating arsenic species from an aqueous solution having a pH of at least about 4.5 comprising the acts of:

adding an iron salt to a solution;

increasing the pressure of said solution;

decreasing the pressure of said solution to precipitate said arsenic species; and separating said arsenic species from said aqueous solution.

2. The method of claim 1 wherein said solution is maintained at an increased pressure for a pressurized reaction period.

3. The method of claim 1 wherein said solution is maintained at a decreased pressure for a depressurized reaction period.

4. The method of claim 1 wherein said solution is maintained at said decreased pressure for an ambient reaction period.

5. The method of claim 1 further comprising oxygenation of said solution prior to said increasing the pressure.

6. The method of claim 1 further comprising aerating said solution prior to said increasing the pressure.

7. The method of claim 6 further comprising injecting air into said solution after said increasing the pressure.

8. The method of claim 7 further comprising adding a chemical oxidant to said solution.

9. The method of claim 6 further comprising adding a chemical oxidant to said solution.

10. The method of claim 1 further comprising injecting air into said solution after said increasing the pressure.

11. The method of claim 7 further comprising adding a chemical oxidant to said solution.

12. The method of claim 1 further comprising adding a chemical oxidant to said solution.

13. The method of claim 12 wherein said chemical oxidant is selected from the group consisting of hydrogen peroxide, ozone, chlorine, potassium permanganate, sodium hypochlorite, potassium hypochlorite, and calcium hypochlorite.

14. The method of claim 1 wherein said increasing said pressure raises said pressure to from about 10 psig to about 120 psig.

15. The method of claim 1 wherein said adding an iron salt comprises pumping a reagent solution into said aqueous solution.

16. A method of precipitating contaminant species from an aqueous solution having a pH of at least about 4.5 comprising:

adding an iron salt to said solution;

oxygenating said solution;

pressurizing said solution for a pressurized reaction period;

depressurizing said solution to a lower pressure for an depressurized reaction period to precipitate particulates of said contaminant species; and separating resulting particulates of said contaminant species from said aqueous solution.

17. The method of claim 16 wherein said contaminant species is arsenic.

18. The method of claim 16 wherein said contaminant species is selected from the group consisting of heavy-metals, transition-metals and post-transition-metals in an aqueous solution.

19. The method of claim 16 wherein said contaminant species is selected from the group consisting of Al, Sb, Ba, Cd, Cr, P, Cu, Pb, Mn, Hg, Mo, Ni, Se, Ag, Sr, Tl, and Zn in an aqueous solution.

20. The method of claim 16 wherein said contaminant species is $PO_4^{-3}$ in aqueous solution.

21. The method of claim 16 wherein said contaminant species is an anionic contaminant in aqueous solution.

* * * * *

UNITED STATES PATENT AND TRADEMARK OFFICE
CERTIFICATE OF CORRECTION

PATENT NO. : 6,398,968 B1
DATED : June 4, 2002
INVENTOR(S) : Loren P. Higby

It is certified that error appears in the above-identified patent and that said Letters Patent is hereby corrected as shown below:

Colum 3,
Line 67, change "effected" to -- affected --

Column 5,
Lines 12, 14, 16, 18, 21, 24 and 27, insert -- a -- before "flow chart"

Column 15,
Line 3, delete the comma (,) after "in preferred"

Column 17,
Line 47, change "136" to -- 124 --

Column 18,
Line 30, insert -- 162 -- before "while it is pressurized"; and delete "162" after "pressurized"

Signed and Sealed this

Twenty-first Day of January, 2003

JAMES E. ROGAN
*Director of the United States Patent and Trademark Office*